Aug. 1, 1961  L. PÉRAS  2,994,411
AUTOMATIC BRAKE ADJUSTING DEVICES
Filed April 7, 1958  3 Sheets-Sheet 1

Aug. 1, 1961 L. PÉRAS 2,994,411
AUTOMATIC BRAKE ADJUSTING DEVICES
Filed April 7, 1958 3 Sheets-Sheet 3

2,994,411
AUTOMATIC BRAKE ADJUSTING DEVICES
Lucien Péras, Billancourt, France, assignor to Regie Nationale des Usines Renault, Billancourt, France
Filed Apr. 7, 1958, Ser. No. 726,659
Claims priority, application France Feb. 18, 1953
5 Claims. (Cl. 188—79.5)

This is a continuation-in-part of my co-pending application, Serial No. 407,626, filed on February 2, 1954, now abandoned.

This invention relates to a brake of the self-wrapping twin-shoe expansion type for automotive vehicles.

In known twin-shoe brakes designed to make the best possible use of the self-wrapping action two adjacent shoe ends are adapted, upon application of the brakes, to be spread apart by a system comprising a floating cam-lever and control tappets. The other shoe ends are interconnected by a link adjustable in length, called a "slack adjuster" or "centralizer," through which lining wear can be compensated by increasing the spacing between the brake shoes. Each shoe is formed in the vicinity of its controlled end with a slot adapted to be engaged upon assembly of the brake drum by a pivot pin fast with the anchor plate and acting as a shoe steady or pivot pin of which the position on the anchor plate is adjustable to permit the proper positioning of the brake shoes.

In a self-wrapping brake system of this description, the self-wrapping action is obtained by applying a pressure from and through any suitable arrangement, for instance of the hydraulic type, on the floating cam-lever acting through a tappet firstly on the so-called "primary" shoe so as to press it against the brake drum. The primary shoe is the first shoe encountered from the cam-lever anchor-pin in the direction of forward rotation of the wheel.

As the primary shoe is carried along by the rotating brake drum, it tends to carry the other or secondary shoe with it and as both brake shoes take their bearing on the steady pin of the secondary shoe, a servo action in the form of a self-wrapping effect produces a brake application. Two return springs of different strengths urge the brake shoes to their released positions, the weaker spring controlling the primary shoe.

The known brakes constructed in accordance with the principles set forth hereinabove have the following drawbacks:

The progressive wear of the brake linings results in a substantial increase in the stroke required for controlling the cam-lever. The arrangement of the shoe control system is such that this stroke increase, given an equal effort exerted by the driver on the brake pedal of the vehicle for example, results in a greater self-wrapping force causing a progresively increasing rate of lining wear. Consequently, an initially small inequality in the adjustment of the right-hand and left-hand brakes, for instance, of a vehicle, will tend to increase since the brake having the most worn linings will produce a greater braking effect, and, therefore, be characterized by a faster rate of lining wear. Obviously, the road-holding qualities and the stability of the vehicle will be seriously impaired.

When the linings of brakes of this type have undergone a certain degree of wear, the adjuster must be set manually in order to increase the clearance between the brake linings and the brake drum of a wheel, for restoring a normal control stroke. As a matter of fact, this unduly long stroke increases the time required for operating the brakes, produces a shock at the beginning of a brake application and facilitates the introduction of foreign matter in the brake mechanism proper.

One object of this invention is to provide the brake with a compensator adapted to reduce automatically the clearance between the brake linings and the drum when the actuating stroke of the cam-lever exceeds a predetermined value.

Another object of this invention consists in controlling the primary shoe by means of a cam instead of a tappet so that for a given effort exerted by the driver on the brake pedal, the braking effort produced by the brake shoes will decrease as a function of the brake lining wear.

In the present invention, the large slack corrections are made intermittently and automatically so that there is no need for periodic brake adjustments as required in presently known brakes.

For a better understanding of the invention and to show how the same may be carried into effect, one embodiment thereof will now be described with reference to the accompanying diagrammatic drawings, in which.

Figure 1:
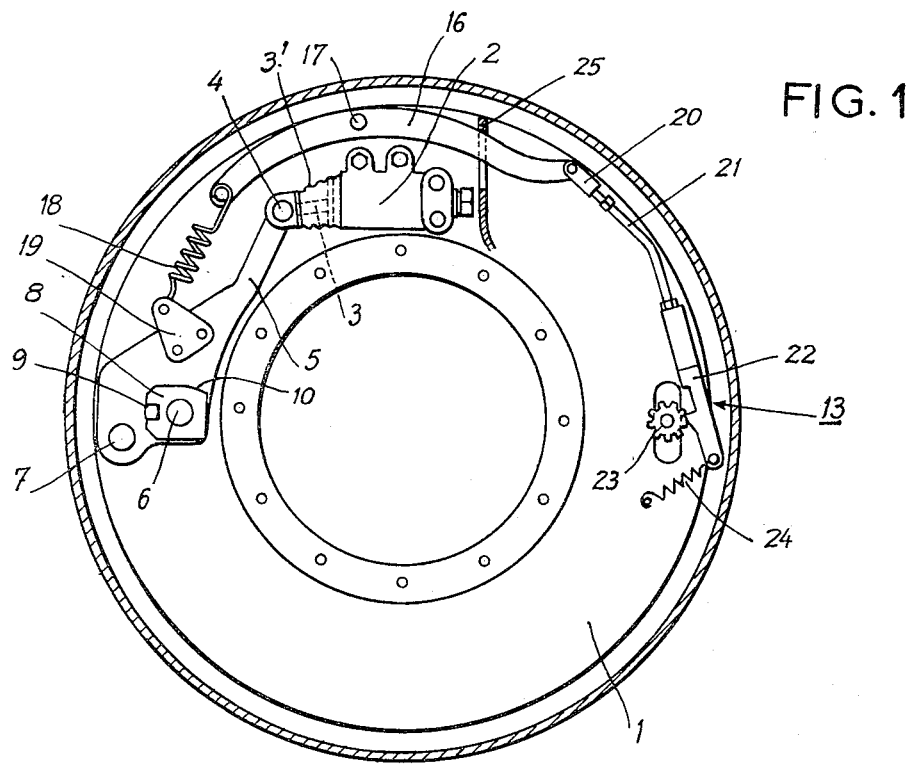
FIG. 1 is an elevation view of a brake according to one embodiment of the invention, the brake shoes and a part of the adjusting mechanism being removed.

On the brake anchor plate 1 comprising mounting holes 26, there is secured a wheel cylinder 2 connected to a hydraulic pressure system (not shown) operated through the brake pedal (not shown) of the vehicle. In the cylinder 2, there is slidably mounted a piston, not shown, subject to the pressure of the liquid in the pipe lines of the system. The piston has a push rod 3 protected by a dust cover $3^1$ and its outer end is provided with a yoke 4 pivotally attached to one end of a cam-lever 5. The other end of this cam-lever is provided with a pair of pins 6, 7 having their axes at right angles to the plane of the drawing. The pins 6 and 7 are fixed to the lower end of the cam lever 5 but are not fixed to the anchor plate. In conventional or known brakes of this general type, the pin nearest the anchor plate center is journalled in a pivoted trunnion. The pin 6 of the embodiment shown, on the contrary, carries a cam 8 operatively connected through a stud 9 to the cam-lever 5. The operative surface 10 of the cam 8 engaging the primary shoe 11 is rounded off in the direction of the center of the anchor plate. The other pin 7 is positioned between the primary and secondary brake shoes 11, 12; shoe 12 having an approximate notch formed therein for this purpose.

Shoe return springs 34 and 35 are provided in the conventional manner for constantly urging these shoe ends toward the center of the anchor plate. The spring 34 acting on the primary shoe 11 is weaker than the spring 35 acting on the secondary shoe 12. Regarding the ends of the shoes which are diametrically opposite the controlled ends thereof, they are interconnected by an adjuster of any known or suitable type, illustrated diagrammatically at 13. This adjuster is generally hand-actuated and allows properly setting the relative positions of the shoes.

The above-described essential members correspond to adjusting devices already known in the art, except for the cam 8 which, according to the present invention, is a substitute for the hitherto used control tappet.

Figure 2:
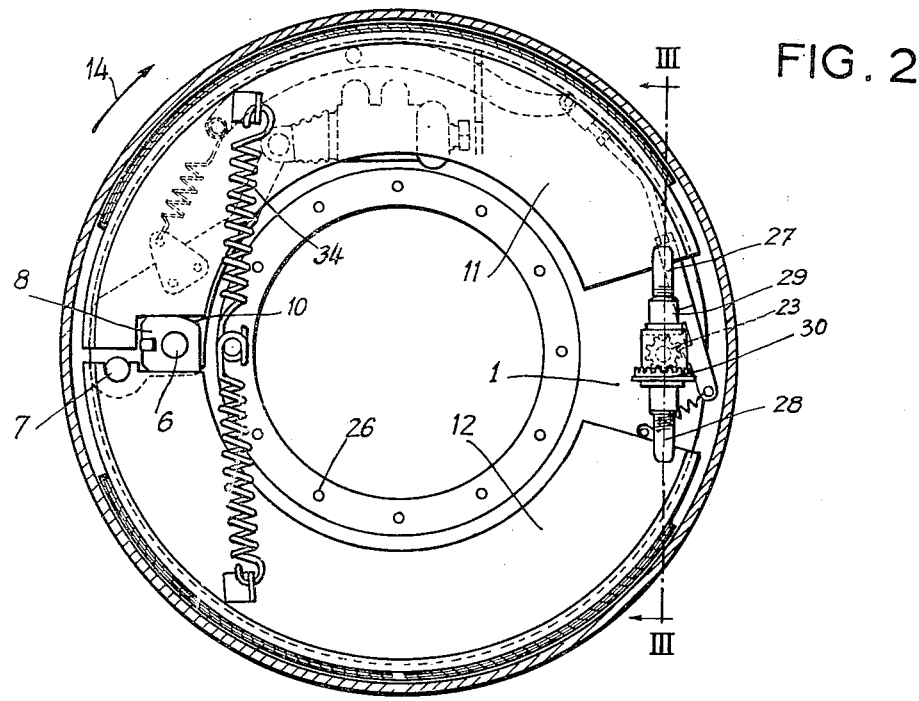
FIG. 2 is an elevation view of the brake of FIG. 1 with the brake shoes and the whole adjusting mechanism in position.

The figures 1 and 2 show a wheel brake drum rotatable in the direction of the arrow 14. The brake operates as follows:

As the driver of the vehicle depresses the brake pedal, the piston in the "master" cylinder (not shown) applies force to the fluid in the pipe lines of the brake installation and this fluid forces the piston in the wheel cylinder 2 to the left, according to the drawing, so as to move the push-rod 3 in the same direction and cause the cam-lever 5 to pivot counter-clockwise. As the return spring 34 of the primary shoe 11 is weaker than that of the secondary shoe 12, this lever 5 will bear through its pin 7 on the notch of shoe 12, thereby spreading the primary shoe 11 apart from shoe 12, through the intermediary of pin 6 and cam 8. Thus, the primary shoe 11 will be pressed against the brake drum, carried along by same, and, through the link-forming adjuster 13, caused to push the other or secondary shoe 12 which is in turn urged against the brake drum. As the lining on shoe 11 wears off and the control stroke accomplished by the piston push-rod 3 increases, the point at which the cam 8 acts upon the primary shoe 11 is displaced, due to the special shape of this cam, toward the center of the anchor plate. In other words, the dimension 15, representing the distance from the center of pin 7 of the cam-lever 5 to the point at which the cam 8 engages the shoe 11, increases as the shoe linings wear off.

Figure 4:
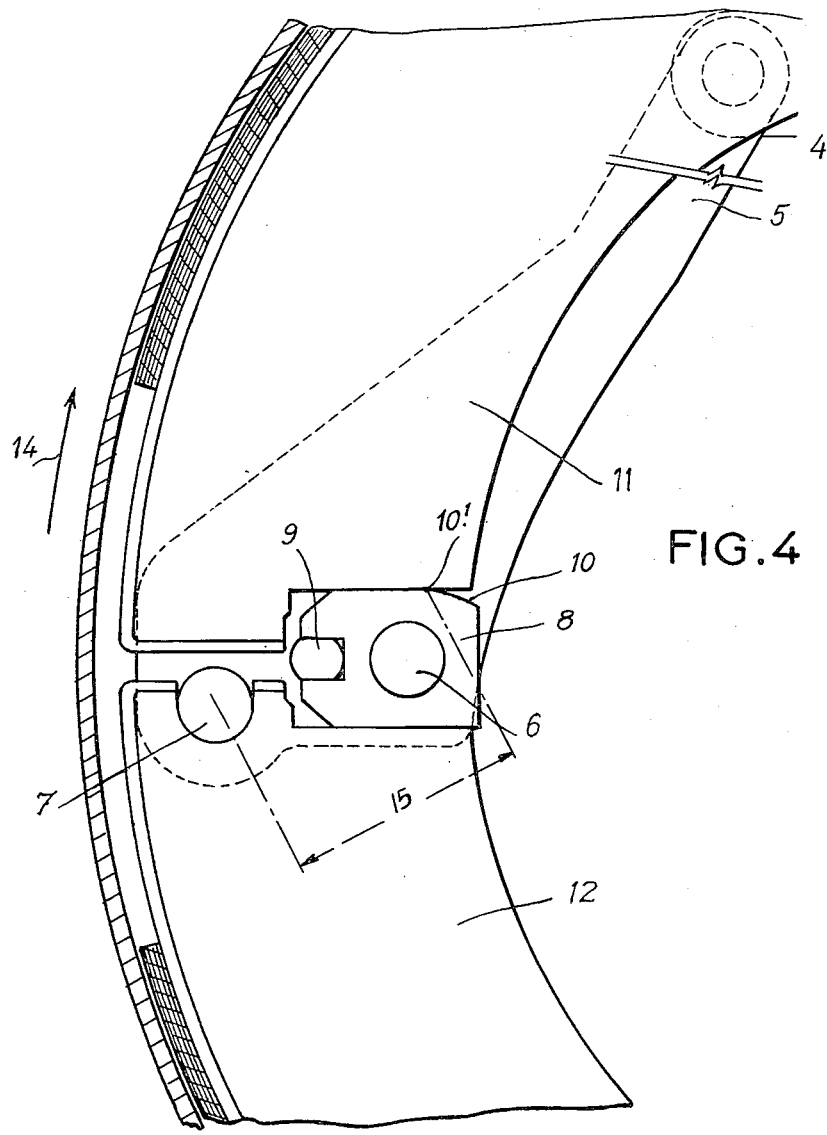
FIG. 4 is a fragmentary view illustrating on an enlarged scale the brake-operating cam and elements cooperating therewith shown in FIG. 2.

The action of the cam 8 will be more understandable with the help of FIG. 4. If the operative surface of cam 8 were an involute centered on the pivoting point 7 of lever 5, the opening of the brake shoes would be exactly proportional to the rotation angle of the lever round its pin 7.

However, the profile 10 of the camming or operative surface 10 of cam 8 is chosen external to the theoretical involute. Accordingly, for a given angular displacement the opening of the brake shoes is greater and the point of contact $10^1$ between cam 8 and primary shoe moves in a direction towards the center of the drum. Thus, the length of the lever arm $7$—$10^1$ increases.

Figure 5:
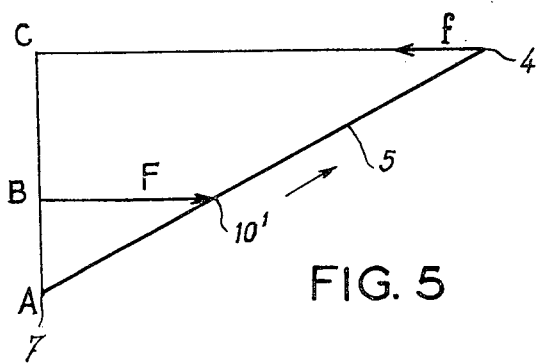
FIG. 5 is a diagram illustrating how the force applied against the brake shoes decreases in dependence upon the cam position.

The forces which are transmitted to the lining varying in inverse ratio to the lever arm, it appears from the diagram of FIG. 5 that the more the point of contact $10^1$ moves towards the center of lever 5 the more the length of AB increases and the less the reaction force F decreases.

According to the principle of levers, if $f$ is the force applied at 4 by the piston 3, and if A is the fixed point corresponding to the pin 7:

$$F \times AB = f \times AC$$

As a result, for a given constant pressure exerted by the piston rod 3, the braking effort decreases as the control stroke of the piston rod increases, and therefore if an inequality exists in the wear of the brake linings of the front and rear wheels respectively, for example, the wear and consequently the brake forces in all the wheels will tend to be equalized automatically.

The improved brake is also provided with an adjusting device automatically controlling the adjuster 13 when the control stroke of piston rod 3 exceeds a predetermined limit. This device comprises the following components:

A lever 16, pivoted on a pin 17 fast with the brake anchor plate is constantly urged in a counter-clockwise direction by a tension spring 18 attached to a lug 19 secured on the cam-lever 5. The other end of lever 16 has pivotally attached thereto a yoke 20 fast with a strut 21 having a rack-shaped end 22 engaging a pinion 23 controlling the adjuster 13. The rack member 23 is urged resiliently against the pinion by a spring 24, as shown. A stop 25 fast with the brake anchor plate limits the amplitude of movement of these parts and assists in guiding them during the operation of the device.

Figure 3:
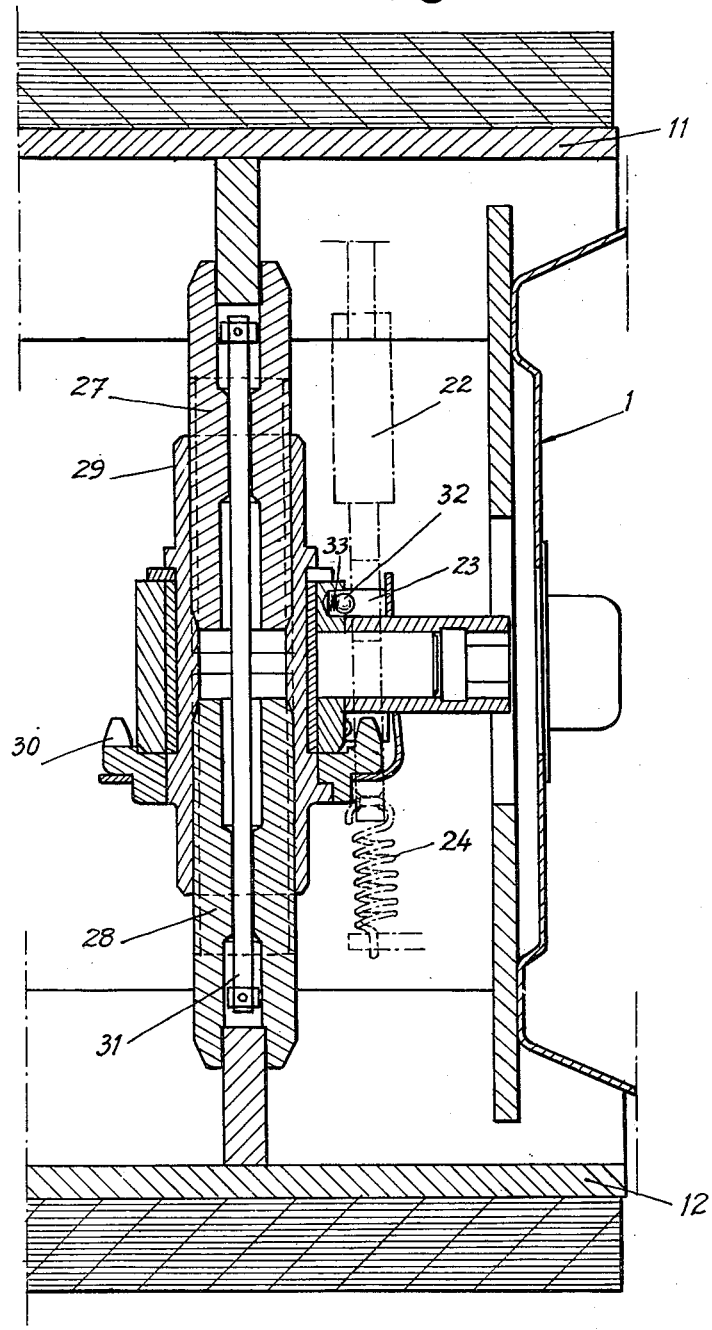
FIG. 3 is a section, on an enlarged scale, of the adjusting mechanism taken on line III—III of FIG. 2.

As illustrated in FIG. 3, the adjusting device 13 consists of two screws 27 and 28, one of which has a right hand thread and the other a left hand thread. These screws turn in a cap tube 29. Tube 29 carries a gear 30 engaged by the pinion 23. The ends of screws 27 and 28 form a unit with the primary shoe 11 and the secondary shoe 12.

The tooth of rack 22 cooperates with teeth of the pinion 23. Each time the rack 22 engages a tooth of the pinion 23, the latter is rotated by a predetermined angular extent and entrains gear 30. This has the effect of turning the cap tube 29, thereby increasing the spacing between screws 27 and 28 and, as a result, that of the adjacent ends of brake shoes 11 and 12. The spacing between screws 27 and 28 is limited by a stop 31. The pinion 23 is braked by a pawl 32 which is urged by a spring 33 into sockets provided on the pinion.

When the brake linings have been worn beyond a predetermined extent a sudden and hard brake application will cause the yoke 4 to displace the adjacent end of lever 16 clockwise about its pivot pin 17 by an angle such as to enable the rack member 22 to engage the next tooth of the pinion 23. Upon releasing the brake pedal, the push-rod 3 will recede, the brake will be released and the spring 18 will restore the lever 16 to its initial position. The rack member 22 will also return to its initial position which is determined by stop 25, but this movement will cause the pinion 23 to rotate to a limited extent in a counterclockwise direction. This limited rotation of the pinion 23 causes the adjuster 13 to increase the spacing between the primary and the secondary shoes 11, 12.

Since the cam means 8 of each wheel compensates automatically and continuously the wear of the brake lining so as to produce equalization of the clearance between the brake linings and the brake drums, the slack-adjusters in all of the wheels, although independent of one another, will tend to be actuated more or less simultaneously to reduce the clearance between the brake linings and the brake drums when this clearance exceeds a predetermined limit.

Thus, any manual readjustment of the brake is avoided until the linings must be definitely replaced with new linings.

It is of the essence of the present invention that while a single slack adjuster is correcting the wear in a single respective wheel, each wheel actually has the same clearance between the lining and the shoes since a predetermined clearance is constantly being maintained by each slack adjuster.

As already pointed out in the foregoing, the example shown and described herein is merely illustrative of the manner in which the invention can be carried out in practice and it will be readily understood that many modifications may be added thereto without departing from the spirit and scope of the invention. Thus, the automatic adjuster of this invention may be controlled by means of any member of which the stroke length upon a brake application is dependent on the degree of wear of the brake linings, irrespective of the manner in which the brake shoes are actuated, for example through mechanical, hydraulic or pneumatic control means.

I claim:

1. In a brake of the self-wrapping, twin-shoe expansion type for automotive vehicles, a brake drum, a primary brake shoe and a secondary brake shoe arranged substantially concentric of said drum with separable adjacent ends, brake lining between the shoes and the drum, a brake control lever pivotally operable to separate the adjacent ends and cause the brake shoes to effectively press against the brake drum and brake lining to brake the vehicle, means for pivotally actuating the lever, means cooperative with said lever for moving said adjacent ends of the brake shoes apart under control of said lever including means for automatically and continuously compensating for brake lining wear comprising a cam stationarily mounted on said lever disposed between the adjacent separable ends of the brake shoes and cooperative therewith, means forming a fulcrum on said lever positioned on said end of the secondary brake shoe, said cam having a cam surface cooperating with said end of the primary brake shoe along a predetermined cam surface area of contact of the cam which is partially arcuate and the arcuate configuration of which is chosen to be external to the theoretical involute center on said fulcrum so that in operation said area of contact shifts in a direction away from said fulcrum in dependence upon pivotal movement of said lever in response to increased clearance between the adjacent ends of the brake shoes as the lining thereof wears, whereby the shift of contact area away from the fulcrum causes said brake shoes to apply a braking force to the drum which decreases for a given pressure applied to said lever as the actuating stroke of the lever increases due to wear of the brake lining.

2. In a brake of the self-wrapping, twin-shoe expansion type for automotive vehicles, a brake drum, a primary brake shoe and a secondary brake shoe arranged substantially concentric of said drum with separable adjacent ends, brake lining between the shoes and the drum, a brake actuator comprising a brake control lever pivotally operable to separate said adjacent ends and cause the brake shoes to effectively press against the drum and brake lining to brake the vehicle, means for pivotally actuating the lever, means cooperative with said lever for moving said adjacent ends of the brake shoes apart under control of said lever including means for automatically and continuously compensating for brake lining wear comprising a cam stationarily mounted on said lever disposed between the adjacent ends of the brake shoes and cooperative therewith, means forming a fulcrum on said lever positioned on said end of the secondary brake shoe, said cam having a cam surface cooperative with said end of the primary brake shoe along a predetermined cam surface area of contact of the cam which is partially arcuate and the arcuate configuration of which is chosen to be external to the theoretical involute center on said fulcrum so that in operation said area of contact shifts in a direction away from said fulcrum in dependence upon pivotal movement of said lever in response to increased clearance between the adjacent ends of the brake shoes as the lining thereof wears, whereby the shift of contact area away from the fulcrum causes said brake shoes to apply a braking force to the drum which decreases for a given pressure applied to said lever as the actuating stroke of the lever increases due to wear of the brake lining, an improved slack adjuster including means cooperative with said lever actuating means for taking up slack in the brake in dependence upon the stroke of the lever exceeding a predetermined limit.

3. In a brake of the self-wrapping, twin-shoe expansion type for automotive vehicles, a brake drum, a primary brake shoe and a secondary brake shoe arranged substantially concentric of said drum with separable adjacent ends, brake lining between the shoes and the drum, a brake actuator comprising a brake control lever pivotally operable to separate said adjacent ends and cause the brake shoes to effectively press against the drum and brake lining to brake the vehicle, means cooperative with said lever for moving said adjacent ends of the brake shoes apart under control of said lever including means for automatically and continuously compensating for brake lining wear comprising a cam stationarily mounted on said lever disposed between the adjacent ends of the brake shoes and cooperative therewith, a pin on said lever mounting the cam on said lever, a second pin on the lever providing a fulcrum on said lever cooperative with the end of the secondary brake shoe and against which said end bears, said second pin being disposed outwardly of said first-mentioned pin, said cam having a cam surface cooperative with said end of the primary brake shoe along a predetermined cam surface area of contact of the cam which is partially arcuate and the arcuate configuration of which is chosen to be external to the theoretical involute center on said fulcrum so that in operation said area of contact shifts in a direction away from said fulcrum in dependence upon pivotal movement of said lever in response to increased clearance between the adjacent ends of the brake shoes as the lining thereof wears, whereby the shift of contact area away from the fulcrum causes said brake shoes to apply a braking force to the drum which decreases proportionately for a given pressure applied to said lever as the actuating stroke of the lever increases due to wear of the brake lining.

4. In a brake of the self-wrapping, twin-shoe expansion type for automotive vehicles, a brake drum, a primary brake shoe and a secondary brake shoe arranged substantially concentric of said drum with separable adjacent ends, brake lining between the shoe and the drum, a brake actuator comprising a brake control lever pivotally operable to separate said adjacent ends and cause the brake shoes to effectively press against the drum and brake lining to brake the vehicle, means cooperative with said lever for moving said adjacent ends of the brake shoes apart under control of said lever including means for automatically and continuously compensating for brake lining wear comprising a cam stationarily mounted on said lever disposed between the adjacent ends of the brake shoes and cooperative therewith, a pin on said lever mounting said cam on said lever, a second pin forming a fulcrum on the lever cooperative with the end of the secondary brake shoe and against which said end bears, said second pin being disposed radially outwardly of said first-mentioned pin, said cam having a cam surface cooperating with said end of the primary brake shoe along a predetermined cam surface area of contact of the cam which is partially arcuate and the arcuate configuration of which is chosen to be external to the theoretical involute center on said fulcrum so that in operation said area of contact shifts in a direction away from said fulcrum in dependence upon pivotal movement of said lever in response to increased clearance between the adjacent ends of the brake shoes as the lining thereof wears, whereby the shift of contact area away from the fulcrum causes said brake shoes to apply a braking force to the drum which decreases proportionately for a given pressure applied to said lever as the pivotal stroke of the lever increases due to wear of the brake lining, an improved slack adjuster including means cooperative with said lever actuating means for taking up slack in the brake in dependence upon the stroke of the lever exceeding a predetermined limit.

5. In a brake according to claim 4, in which said slack adjuster comprises a pinion, means operable by said pinion for varying the clearance between the brake lining and cooperating drum surface, a rack for rotating said pinion, means for actuating the rack only when the stroke of said brake control lever exceeds a predetermined limit corresponding to a predetermined degree of wear of said lining.

References Cited in the file of this patent

UNITED STATES PATENTS

| | | |
|---|---|---|
| 1,694,776 | Flanigan | Dec. 11, 1928 |
| 1,824,552 | Khezarjian | Sept. 22, 1931 |
| 1,974,943 | Baits | Sept. 25, 1934 |
| 2,019,101 | Smith | Oct. 29, 1935 |
| 2,066,077 | Sanford et al. | Dec. 29, 1936 |
| 2,087,383 | Lafitte | July 20, 1937 |
| 2,137,522 | Axtmann | Nov. 22, 1938 |
| 2,243,469 | Moore | May 27, 1941 |